W. E. ROE.
CLUTCH.
APPLICATION FILED OCT. 7, 1914.

1,284,780.

Patented Nov. 12, 1918.
3 SHEETS—SHEET 2.

Witnesses
A. L. Amstutz
M. G. Campbell

Inventor
Walter E. Roe
By N. S. Amstutz
Attorney

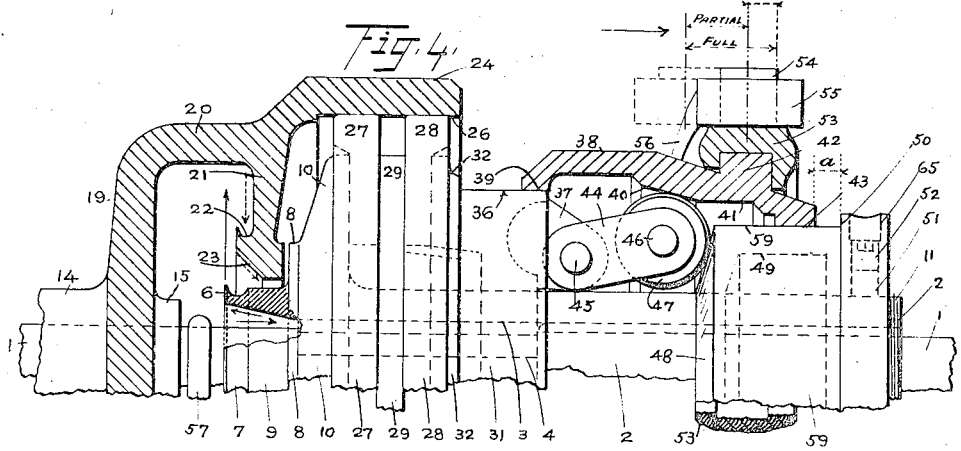

UNITED STATES PATENT OFFICE.

WALTER E. ROE, OF MISHAWAKA, INDIANA, ASSIGNOR TO DODGE MANUFACTURING COMPANY, OF MISHAWAKA, INDIANA, A CORPORATION OF INDIANA.

CLUTCH.

1,284,780.

Specification of Letters Patent. Patented Nov. 12, 1918.

Application filed October 7, 1914. Serial No. 865,503.

*To all whom it may concern:*

Be it known that WALTER E. ROE, citizen of the United States, residing at Mishawaka, in the county of St. Joseph and State of Indiana, has invented certain new and useful Improvements in Clutches, of which the following is a specification.

My invention relates to improvements in clutches and it appertains more especially to the features pointed out in the annexed claims.

The purpose of my invention is to provide a clutch that has no projections of any kind whatever from the rotating parts; that is dust proof; that is self oiling; that overcomes any centrifugal tendency to throw itself into action; that is compact, efficient and economical to manufacture; that will not stick under the heaviest duty; one whose frictional parts are simple and easily replaced; that has a maximum effect with a minimum thrust; that insures a permanency of alinement, extreme simplicity in assembling and ease of adjustment.

With these and other related ends in view I illustrate in the accompanying drawings such instances of adaptation as will disclose the broad features thereof without limiting myself to the specific details shown.

Fig. 4 is a view similar to the upper portion of Fig. 1 showing the clutch partly released.

Fig. 5 is an elevation of a cut-off coupling adaptation.

Figs. 6 and 7 are detached elevations in section of modified friction elements.

Figure 1:
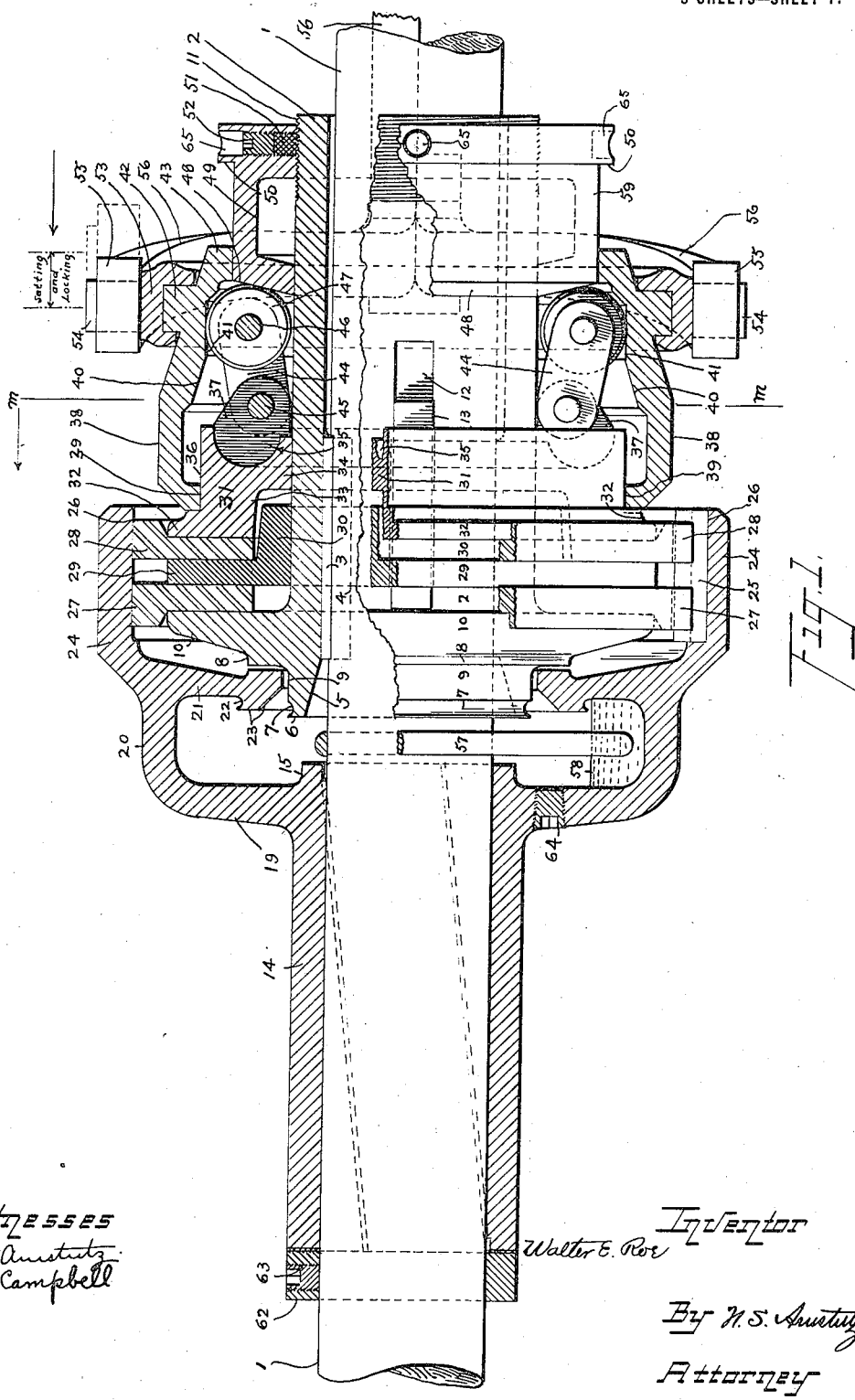
Figure 1 is a longitudinal elevation partly in section.

In the type of clutch instanced I am able to use various forms of friction elements, interchangeably if desired so that the general clutch parts may be standardized and the wearing parts adapted to the specific requirements of different installations or the variable demands of heavy or light service. The clutch is unique in having practically all of its rotating parts concentric and annular in conformation so that the entire clutch can be disassembled by the removal of one part, all of which insures the production of a clutch at a minimum cost.

Many so called safety clutches have small protruding parts which make their name a delusion and a snare, for it is a well known fact that the smallest projection is as dangerous as more easily seen and readily avoided large ones. The danger lies in their seeming insignificance. It is also apparent that with my form of clutch no extraneous shields of any kind are required and the clutch can be operated in exposed situations even more safely than ordinary pulleys. The great accessibility of the several parts constituting a clutch makes it easy to renew or exchange the friction elements to meet the demands of low or high speed duty as well as variable services heretofore referred to.

In clutches of this type where, obviously, no projecting parts are allowable, a self-oiling system to properly lubricate the "rotative" member is desirable. Provision has been made for such a system and liabilities to leakage eliminated.

On a suitable shaft 1 a flanged abutting member 2 is rigidly secured by a key 3 in key way 4. Its extreme free end constitutes a tubular extension, in that it is bored to a greater diameter than the shaft so as to adapt a standard member to varying sized shafts and also minimize the amount of machining to be done in preparing the same for such variations. This is feasible because all the heavy angular stresses occur in the plane of key 3. An annular flange 10 projects radially forming an inner flat face against which a friction element is made to operate. This flange has a hub 8 forming a shoulder that limits endwise movement of the "free" portion 20 of the clutch.

A second hub 9 of smaller diameter joins onto 8 and it projects longitudinally beyond the key 3 so as to terminate in an annular oil catching groove 7 which joins perpendicular face 6 in practically a "knife edge." A conical portion 5 leads from 6 to the meeting faces of the shaft and member 2. The purpose of 5 is to cause any oil that may travel along the shaft to be sent by centrifugal force over its conical surface and be projected along 6 against the inside of casing 20. The groove 7 assists in preventing an excess of oil passing along hubs 9 and 8 into the clutch space. What small amount that may pass this way will be just enough to keep the friction members properly lubricated. Annular groove 22 formed on an inner flange 21 of bell 20 directs any oil which may accumulate on 21 while the clutch is stationary, into oil chamber 58 and any excess of oil accumulating between 9 and the cone 23 is thrown out centrifugally.

A central friction disk 29 has a hub 30 formed thereon which has free endwise movement on 2 but is held against independent rotation by key 13. This key also serves the same purpose for the clutch compressing member 31 whose hub 34 slides on 2. The part 31 is substantially an annular ring with a recess 33 to afford clearance for hub 30 and a radial projecting face 32, an external hub 36, a weight reducing groove 35 and a pair of ears 37 formed thereon. Key 13 carries it rotarily. Between 32 and 29 annular friction member 28 is placed and between 29 and 10 another friction member 27 is held. These friction members are substantially ring shaped. They have free endwise movement on the inner face 26 of the annular projection 24 of bell 20 but are held to rotate with 24 by key 25.

As instanced in Fig. 1, parts 10, 29, 32 and 27 with 28 are metal to metal. In Fig. 6 the friction member rings 27ª and 28ª hold series of removable blocks 66 of wood, cork or the like in suitable grid-like openings, the entire clutching taking place between 10, 29, 32 and blocks 66 placed between them. The central member 29 has a hub 69. An annular actuating ring 31 may be substantially the same as that shown in Fig. 1. Should other conditions demand different friction members they may also be used in the same cylindrical projection 24 subject to key 25 which similarly serves all interchanges. The friction members 27ª and 28ª of Fig. 7 have attached thereto fiber or similar faces 68, being held thereon by suitable dowels 67 or other fastenings. In this instance central member 29 also has a hub 69 which is a substantial counterpart of that shown in Fig. 6.

Figure 2:
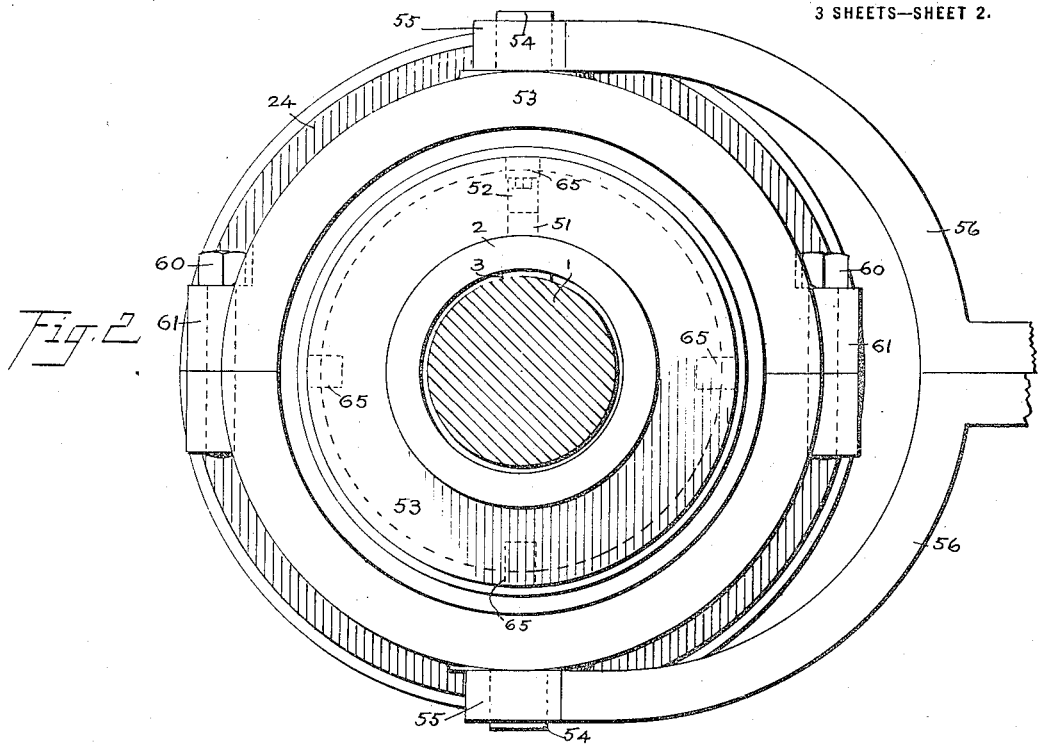
Fig. 2 is a right hand end elevation of Fig. 1.
Figure 3:
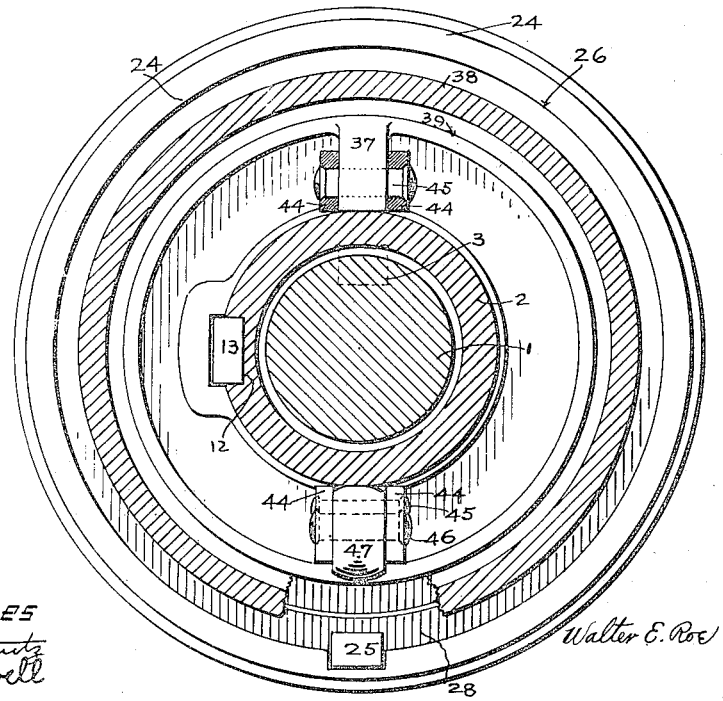
Fig. 3 is a transverse section on line *m—m* of Fig. 1.

The compression member 31 slides to and fro on sleeve 2 the slight distance required to engage and disengage the clutch parts, being carried rotarily by key 13 which is solidly embedded in key way 12 formed on 2. This action is brought about through rollers 47 engaging surfaces 40 and 41 while connected with ears 37 through links 44, a pair of which are pivoted to ears 37 by pins 45, holding roller 47 between them, on pin 46. (Fig. 3). Sleeve 38 is held in alinement by means of flange 43 sliding on the outer face 59 of conical abutment 49. It has an exterior flange 42 by means of which the two-part ring 53, its internal groove and radial pins 54 are moved lengthwise of the shaft by ears 55 of the forked shifter arm 56 pivoted on an adjacent fulcrum. Split ring 53 has enlargements 61 in which clamping screws 60 are placed to hold the same on 53. (See Fig. 2).

In order that the movements of rollers 47 on cone 40 may be imparted to 31, the rollers are caused to engage cone surface 48 of the abutment 49 so that as cone 40 forces them inwardly in a radial direction, the more abrupt cone 48 forces them endwise making a veritable toggle-joint. On reversing the movements of arm 56 sleeve 38 is withdrawn freeing rollers 47 from radial restraint on account of which the compression stresses of the friction parts react and cause the rollers to move outward along conical face 48, releasing the clutch. The weight of the rollers and links is enough so that they will act similarly to a centrifugal governor and prevent the clutch from setting itself into engagement. In order that the dimensional correlation of sleeve 38, rollers 47, compression member 31 and conical abutment 49 may be quickly and positively established the latter is held on the extension 2 by screw threads 11, thus admitting of a most delicate endwise adjustment. It is locked in position by set screw 52 abutting soft metal plug 51 which engages threads 11 without injuring them. Externally of screw 52, the hole 65 is enlarged and without threads to conform to three other similar holes located around the periphery of flange 50 at 90° apart to accommodate a spanner wrench used in rotating the abutment while adjusting its endwise position. The flange 50 serves to prevent the accidental misplacement of the sleeve 38.

It will be seen that the removal of abutment 49 at once releases all of the clutch elements, none of which collapse or become disarranged, for instant change so that reassembling is in effect just as easy as dismemberment.

In self contained clutches it is very desirable to have the same dust proof so that none will enter the bearing area of the continuously revolving part of the clutch. This is accomplished by the broken joints of the compression, friction and driving members of the mechanism. For dust to enter the oil chamber 58 is practically impossible as it would have to travel past all of the various clutch faces. A felt washer may be placed between collar 62 and hub 14 so as to exclude dust at this point, or the same may be sealed off externally in any suitable manner.

A suitable self-oiling system will be found desirable in this type of clutch. This is accomplished by putting a plug 64 in a threaded opening formed in the flange 19, which admits of lubricant being introduced into chamber 58 when the parts are standing still. The oil is carried onto the shaft by a well known type of ring oiler 57 which plays on shaft 1 between hub 15 and face 6, or any system of paddles or wings may be used instead, for instance such as are shown in my application Serial #2891 filed Jan. 18, 1915. The bell 20 floats on shaft 1 between collar 62 held by set screw 63 and hub 8. Any desired form of oil grooves may be formed on the inner face of 14. The dotted arrows of Fig. 4 show oil traverse when the parts are standing still and the full arrows when in motion.

As shown, part 2 does the driving and part 20 is intermittently driven. Should this order be reversed then 20 would be keyed to the shaft and 2 float freely between suitable collars except when clutched to 20. The transposition of internal oil grooves from 14 to 2 would constitute a substantially equivalent construction. The clutch features are not limited to the specific use instanced in Figs. 1 and 6 but they may be as efficiently utilized for cut-off couplings by having the hub 14 secured to shaft 17 by key 18. The centers may be kept in close alinement by the projecting end 16 of shaft 1 entering into hub 15 (see Fig. 5).

The locking feature is important because it automatically locks the toggle parts and holds them while in action and yet is held "free", if used as a driver, by the centrifugal play of the toggle links whenever the clutch members are disengaged. Should the extension 2 with its attached parts be used as the driven member the parts will of course be inactive when disengaged because they are not in rotation. The locking is equally effective regardless of any "driver" or "driven" relation holding the clutch against accidental release whatever condition of rapid vibration it may be subjected to. The range of locking is large without hampering the clutching action which is brought about by the coöperation of parallel face 41 and the cone 48 so as to hold rollers 47 between them. As soon as conical surfaces 40 and 48 coact on rollers 47 the clutch is being released if 38 moves to the right. A contrawise movement of conical sleeve 38 sets the clutch. See arrows of Figs. 1 and 4.

If desired the annular portion 24 of bell 20 may be extended so as to overlap 38 when it is in its extreme "open" position and the diameter of 38 may be increased so as to allow only a working clearance between it and face 26. This clearance might be "sealed off" in any desired manner with any suitable packing if found expedient. This would close all open recesses and leave the outside substantially cylindrical.

Should part 20 be used as the driver then the oil ring 57 would lift the oil just the same as when part 2 is the driver. In either case the extension of the shaft through the driven member insures exact alinement without depending on any of the casing's interior surfaces of much larger radius and greater frictional effect. This insures the highest possible working efficiency.

What I claim is,

1. A continuously rotating driving member, an intermittently driven member, an axial support for both members, clutch parts between the two members, means for engaging and disengaging such parts comprising an abutting flange having a tubular extension integral therewith, a compression ring slidable on the extension having a hub, ears attached to the radial face of the hub, links pivoted in said ears, an external bearing face formed on the hub, an adjustable conical member secured to the tubular extension having an external bearing face thereon, a sleeve slidable on both bearing faces having conical and parallel surfaces formed on the inside thereof, rollers carried by the free ends of the links, an external flange formed on said sleeve, a two-part ring engaging the flange, projections from such ring, means for engaging the projections adapted to hold the ring from rotation whereby the sleeve may also be moved to and fro axially on its bearing faces so as to cause the free ends of the links to move radially through the engagement of the internal conical surfaces with the rollers carried by the links thereby actuating the clutch parts to connect the rotating and rotative members, lock the acting means, and subsequently release the parts as desired.

2. In clutches, a rotating member, a rotative member, clutch parts placed therebetween, an abutting member placed on one side of such parts, a compression member operable against the other face of the clutch parts, a tubular extension integral with the abutting member forming a support for the compression member, an annular conical adjusting abutment having an integral flange formed thereon at its outer end, means for holding the same on the extension, a hollow sleeve slidable on the abutment and the compressing member said sleeve having internally formed parallel and conical surfaces, a plurality of links pivotally secured to the compression member, rollers attached to their free ends, adapted to engage both conical surfaces or a conical and parallel surface simultaneously, and means for axially moving the sleeve to effect the engagement, locking and release of the clutch parts.

3. In clutches, the combination with a rotative driven member and a rotating driving member, a tubular extension therefrom, of a plurality of rollers, a plurality of links pivoted at one end, for holding the rollers, a clutching part to which the links are pivoted, a slidable external sleeve movable axially having an internal conical surface adapted to engage the rollers, a conical abutment on the tubular extension adapted to simultaneously engage the rollers, whereby through the endwise movement of the sleeve the rollers and links are simultaneously moved radially and longitudinally to effect the clutching, locking and releasing of the rotatable members.

4. In clutches, a rotating member, a rotative member, clutch parts projecting radially from both members, an abutting flange on one side and a compression member on the other side of such parts adapted to have endwise movement toward the flange to cause the clutch parts to engage and disengage as desired, a plurality of links pivoted on the compression member, rollers carried by their free ends, an annular abutment having a conical inner end, means for preventing free endwise movement thereof, a slidable external sleeve having internally placed and adjacently formed parallel and conical surfaces adapted to successively engage the rollers to hold them against the abutment, and means for moving the sleeve endwise whereby the free ends of the links are shifted radially and the compression member endwise to connect and disconnect the clutch.

5. Rotatable clutch members in alinement with each other, a plurality of friction rings interposed between a plurality of flanged compression parts, means for holding the same between the clutch members, an adjustable abutment having a conical inner end supported by one of the members, an axially placed sleeve having an internal cone and a tubular part simultaneously slidable on one of the compression members and the abutment whereby its interior is protected against the influx of dust, etc., a plurality of links pivoted to the compression member their free ends being held in different radial positions with respect to the center of clutch rotation by the coördinate action of the cones and the tubular part of the sleeve whereby as it is given endwise movement the clutch is thrown into or out of action.

6. In clutches, a suitable shaft, a rotatable member secured thereon, another rotating member free from said shaft, means for connecting and disconnecting the two members as desired, an oil chamber in one of said members, means for automatically applying the oil to the wearing surfaces, annular external grooves on projecting hubs of said members and internal conical surfaces formed therein whereby the passage of lubricant to the clutch parts is controlled.

7. In clutches a suitable shaft, a rotatable member secured thereon, another member free from said shaft but having bearing thereon, means for connecting and disconnecting the two members as desired, an oil chamber in one of said members, means for automatically supplying oil from the chamber to the bearing, in combination with internal cones and adjacent annular grooves formed on the inner surfaces of the secured and free-members whereby an excess of lubricant is kept from the clutching surfaces of the members and is automatically returned to the oil chamber.

8. In clutches, a shaft common to all the clutch members, a loose carrier member comprising a hub, a flange and an annular projecting rim said member being free to rotate independently of the shaft, an abutting member comprising a flange and an integral sleeve the flange being placed adjacent the flange of the carrier member said abutting member being positively secured to the shaft, friction plates carried by the free member, removable wearing surfaces carried by the plates said plates being free to slide endwise while being carried rotarily inside of and by the annular rim of the carrier member, an internal compression member between the friction plates, slidable on the sleeve and rotated therewith, an external compression member also slidable on the said sleeve and rotatable therewith, said member having an external hub, an adjustably fixed conically faced collar secured to the sleeve near its extremity, a second sleeve slidable on the collar and the hub of the external compression member, and interacting means between the collar and said member inclosed by and operable through the second sleeve, adapted on the to and fro movement of said sleeve to actuate the external compression member to open and close the clutch.

In testimony whereof I affix my signature in presence of two witnesses.

WALTER E. ROE.

Witnesses:
W. B. HOSFORD,
T. H. NORMAN.